Patented June 3, 1952

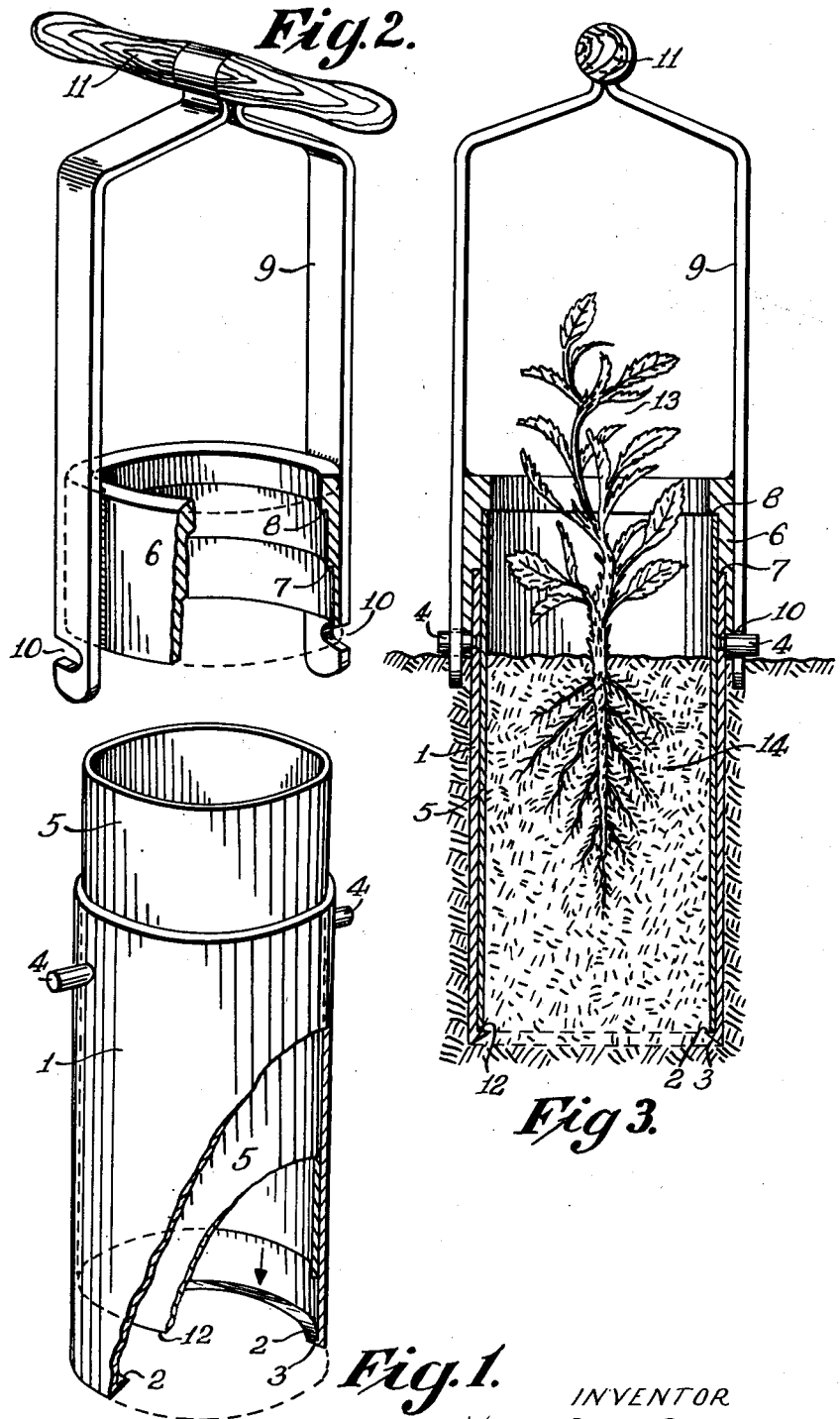

2,599,087

UNITED STATES PATENT OFFICE 2,599,087

TRANSPLANTING DEVICE

William Bedell Benison, Maskeliya, Ceylon

Application May 10, 1949, Serial No. 92,456

6 Claims. (Cl. 294—50.7)

This invention relates to a device for removing seedlings, plants and the like from the ground or from containers preparatory to transplanting.

It is common knowledge that in the operation of transplanting, the soil around the roots of a plant or seedling should be disturbed as little as possible. With this object in view, I have already proposed a device comprising a tubular member adapted to be driven into the ground so as to surround the plant to be removed and means whereby such tubular member may be withdrawn from the ground with the plant and the soil around its roots contained within it. The tubular member is then transported to the transplanting site and inserted into a prepared hole, whereafter, by employing certain auxiliary devices, it is removed from the ground leaving the plant and its surrounding soil firmly embedded in the new site.

Whilst the aforementioned device functions quite satisfactorily, it will be appreciated that a considerable number of tubular members are required if transplanting on a large scale is to be carried out efficiently. Since the tubular members have to be used over and over again, they must be of robust construction and not only is the cost somewhat high but the cumulative weight to be conveyed backwards and forwards from the nursery to the transplanting site is a factor to be reckoned with.

The object of the present invention is to overcome these disadvantages and also to obviate the use of the auxiliary devices at the transplanting site.

In accordance with the invention, therefore, a device for removing seedlings, plants and the like from the ground or from containers preparatory to transplanting comprises, in combination, a hollow liner open at both ends and made of decomposable material which is noninjurious to plant life; a hollow sleeve member within which the liner is to be received, said sleeve member being open at both ends and provided with inwardly projecting means to support the lower end of the liner, and being also of such length relative to the liner that when the latter has been inserted into the sleeve its upper end projects therefrom; and an operating device comprising a hollow member open at both ends and provided with inwardly projecting means in two different transverse planes, the upper of said means being adapted to abut against the upper end of the liner and the lower against the upper edge of the sleeve member, a handle for said hollow member, and interlocking means whereby, when the hollow member has been placed in position over the upper ends of the sleeve member and liner, relative axial movement between said hollow member and said sleeve member may temporarily be prevented.

The sleeve member, liner and hollow member are preferably of circular cross-section and the inwardly projecting means may in each case comprise an inwardly extending annular flange.

The interlocking means may comprise a pair of pins situated at opposite ends of a diameter near the top of the sleeve member and projecting radially outwards from the periphery thereof, coupled with bayonet sockets attached to and depending from the hollow member or the handle. In this way, rotation of the hollow member relative to the sleeve member will cause the sockets to be engaged with or disengaged from the pins as desired.

In order to facilitate the entry of the sleeve member into the soil, its lower end may be sharpened.

The liner may be made of paper or cardboard impregnated with a vegetable oil.

One embodiment of the invention will now be described with reference to the accompanying drawings, in which:

Fig. 1 is a perspective view (partly broken away) of the sleeve member with the liner in process of being inserted therein.

Fig. 2 is a perspective view (partly broken away) of the operating device by means of which the sleeve member and liner are driven into and removed from the ground.

Fig. 3 is a sectional elevation of the composite device in use.

Referring to the drawings, the sleeve member comprises a hollow steel tube 1 which is open at both ends and provided near its lower extremity with an inwardly extending annular flange 2. Said lower extremity is chamfered at 3 to provide a sharp cutting edge and so to facilitate the driving of the tube into the ground. 4 are bayonet pins which are set at opposite extremities of a diameter and project radially outwards from the external periphery of the tube.

The liner comprises a hollow tube 5 of thick paper or cardboard impregnated with a vegetable oil. It is of greater overall length than the sleeve member and is of such diameter that it is a close fit therein.

The operating device shown in Fig. 2 comprises an annular ring 6 formed internally with two annular flanges 7 and 8. The upper of said flanges projects radially inwards to a greater extent than the lower.

A U-shaped stirrup 9 is welded to the ring 6 as shown and the free extremities of the arms of the U are formed with bayonet sockets 10 adapted to be engaged with the pins 4 on the outer tube 1. A transverse element 11 facilitates manipulation of the operating device.

In use, the liner 5 is inserted into the sleeve member 1 and pushed down until its lower end 12 rests upon the annular flange 2. In this position, the upper extremity of the liner 5 projects from the sleeve member 1.

The operating device is now engaged with the sleeve member. To this end, the ring 6 is slipped over such sleeve member and the flanges 7 and 8 abut respectively against the upper end of the sleeve member 1 and the upper end of the liner 5. A slight rotation of the operating device relative to the sleeve member engages the sockets 10 with the pins 4.

The soil around the plant to be removed is thoroughly watered and, by exerting downward pressure on the handle 11, the sleeve member (with the liner housed within it) is driven into the ground preferably until the pins 4 rest on the surface (see Fig. 3).

The device is now rocked to and fro or slightly rotated to loosen the soil, whereafter it is drawn out of the ground. The plant 13 with the soil 14 immediately surrounding its roots undisturbed is now contained within the liner 5.

The operating device is disengaged and the liner removed from the sleeve member by grasping the upper extremity of the liner which, as stated above, projects from the sleeve member.

A fresh liner is then inserted into the sleeve member and the whole operation is repeated until the desired number of plants have been removed.

Such plants are then transported to the new site where they are replanted together with the liners in which they are contained. Said liners are decomposable and for this reason subsequent development of the root structure is not affected since, by the time the roots have grown outwards to the wall of the liner, the liner has either disintegrated in the ground or offers such small resistance that the roots may penetrate it easily.

It will be understood that the diameter of the liner is dependent upon the size of the plants to be removed. For general purposes, however, an internal diameter of about 4" is quite satisfactory.

If desired, the operating device may be engaged with the sleeve member (no liner being employed) for the purpose of preparing the holes at the transplanting site.

I claim:
1. A device for removing plants with soil around them preparatory to transplanting comprising, in combination, a hollow liner open at both ends and made of a decomposable material which is non-injurious to plant life; a hollow sleeve member within which the liner is to be received as a close fit therein, said sleeve member being open at both ends and provided at or near its lower end with inwardly projecting flange means to support the lower end of the liner, and being also of such length relative to the liner that when the latter has been inserted into the sleeve its upper end projects therefrom; an operating device comprising a hollow member open at both ends and provided with inwardly projecting flange means in two different transverse planes, the upper of said flange means being adapted to abut against the upper end of the liner and the lower against the upper end of the sleeve member, and a handle for said hollow member; and interlocking means comprising two complementary elements one of which is carried by the sleeve member and the other by the operating device, said two elements being interengageable so as temporarily to prevent relative axial movement between the operating device and the sleeve member when said operating device has been placed in position over the upper ends of the sleeve member and liner.

2. A device, according to claim 1, in which the sleeve member, liner and hollow member are of circular cross-section.

3. A device, according to claim 1, in which the interlocking means comprises a pair of pins situated at opposite ends of a diameter near the top of the sleeve member and projecting radially outwards from the periphery thereof, coupled with bayonet sockets formed on the handle.

4. A device according to claim 1, in which the handle comprises a U-shaped stirrup attached to the hollow member, the free extremities of the arms of the U extending below the hollow member and being formed with bayonet sockets.

5. A device, according to claim 1, in which the lower end of the sleeve member is sharpened.

6. A device, according to claim 1, in which the inwardly projecting means comprises in each case an inwardly extending flange and in which the upper of said flanges projects radially inward to a greater extent than the lower.

WILLIAM BEDELL BENISON.

REFERENCES CITED

The following references are of record in the file of this patent:

UNITED STATES PATENTS

| Number | Name | Date |
| --- | --- | --- |
| 837,977 | Thornton | Dec. 11, 1906 |
| 1,129,924 | Von Hassel | Mar. 2, 1915 |
| 1,194,992 | Gibson | Aug. 15, 1916 |

FOREIGN PATENTS

| Number | Country | Date |
| --- | --- | --- |
| 566,503 | Great Britain | Jan. 2, 1945 |

OTHER REFERENCES

Instruments d'Agriculture et de Jardinage Boitard (translation p. 85, transplanter with double cylinder).